(12) United States Patent
Zhang et al.

(10) Patent No.: US 10,732,148 B2
(45) Date of Patent: Aug. 4, 2020

(54) DOUBLE-ROBOT SYSTEM FOR DETECTING FLAW OF RIM OR SPOKE

(71) Applicant: BEIJING LEAD TIME SCIENCE & TECHNOLOGY CO., LTD., Beijing (CN)

(72) Inventors: Yu Zhang, Beijing (CN); Li Wang, Beijing (CN); Xiaorong Gao, Beijing (CN); Quanke Zhao, Beijing (CN); Zeyong Wang, Beijing (CN); Jianping Peng, Beijing (CN); Kai Yang, Beijing (CN); Chaoyong Peng, Beijing (CN); Xiang Zhang, Beijing (CN); Jianzhong Wen, Beijing (CN); You Tan, Beijing (CN); Xingyu Zhang, Beijing (CN); Yongjun Luo, Beijing (CN); Tiandou Zhang, Beijing (CN); Xiaolong Liao, Beijing (CN)

(73) Assignee: BEIJING LEAD TIME SCIENCE & TECHNOLOGY CO., LTD., Beijing (CN)

( * ) Notice: Subject to any disclaimer, the term of this patent is extended or adjusted under 35 U.S.C. 154(b) by 260 days.

(21) Appl. No.: 15/776,691

(22) PCT Filed: Aug. 23, 2017

(86) PCT No.: PCT/CN2017/098619
§ 371 (c)(1),
(2) Date: May 16, 2018

(87) PCT Pub. No.: WO2018/036509
PCT Pub. Date: Mar. 1, 2018

(65) Prior Publication Data
US 2018/0328893 A1    Nov. 15, 2018

(30) Foreign Application Priority Data

Aug. 24, 2016  (CN) .......................... 2016 1 0721182

(51) Int. Cl.
*G01N 29/22*   (2006.01)
*B61K 9/12*   (2006.01)
(Continued)

(52) U.S. Cl.
CPC ............. *G01N 29/225* (2013.01); *B61K 9/12* (2013.01); *G01M 17/10* (2013.01); *G01N 29/04* (2013.01);
(Continued)

(58) Field of Classification Search
CPC combination set(s) only.
See application file for complete search history.

(56) References Cited

U.S. PATENT DOCUMENTS

2016/0178484 A1* 6/2016 Ma ........................ G01M 17/08
73/146

FOREIGN PATENT DOCUMENTS

CN       102269660 A    12/2011
CN       103868991 A    6/2014
(Continued)

OTHER PUBLICATIONS

International Search Report for PCT/CN2017/098619, dated Nov. 13, 2017, ISA/CN.

*Primary Examiner* — Eric S. McCall
*Assistant Examiner* — Timothy P Graves
(74) *Attorney, Agent, or Firm* — Yue (Robert) Xu; Apex Attorneys at Law, LLP

(57) ABSTRACT

A double-robot system for detecting a flaw of a rim or a spoke includes a movable cart, a lifting platform, a lifting rotating mechanism, and robots. The lifting platform is movably connected to the movable cart in a vertical direction. The lifting rotating mechanism is disposed on the lifting platform. A wheel lifting arm is disposed on each of the left side and the right side of the lifting rotating mecha- (Continued)

nism. The wheel lifting arms are used for lap joint on a rail where a wheel in detection is located. One robot is fixedly connected to each of the front side and the rear side of the lifting rotating mechanism. Each robot is provided with a tread carrier. The lifting rotating mechanism is also provided with two inner carriers.

8 Claims, 8 Drawing Sheets

(51) Int. Cl.
    *G01N 29/27*     (2006.01)
    *G01N 29/04*     (2006.01)
    *G01M 17/10*     (2006.01)

(52) U.S. Cl.
    CPC ........... *G01N 29/043* (2013.01); *G01N 29/27* (2013.01); *G01N 2291/2696* (2013.01)

(56) References Cited

FOREIGN PATENT DOCUMENTS

| | | |
|---|---|---|
| CN | 104076090 A | 10/2014 |
| CN | 203929714 U | 11/2014 |
| CN | 104477211 A | 4/2015 |
| CN | 204758541 U | 11/2015 |
| CN | 106080664 A | 11/2016 |
| CN | 106394604 A | 2/2017 |
| CN | 205930760 U | 2/2017 |
| EP | 2402227 A1 | 1/2012 |
| JP | H0933457 A | 2/1997 |
| JP | H10325829 A | 12/1998 |
| WO | 0078587 A2 | 12/2000 |

\* cited by examiner

DOUBLE-ROBOT SYSTEM FOR DETECTING FLAW OF RIM OR SPOKE

The present application is a National Phase entry of PCT Application No. PCT/CN2017/098619, filed on Aug. 23, 2017, which claims the benefit of priority to Chinese patent application No. 201610721182.0 titled "RIM AND SPOKE FLAW DETECTION SYSTEM HAVING TWO MANIPULATORS", filed with the Chinese State Intellectual Property Office on Aug. 24, 2016, the entire disclosures of which are incorporated herein by reference.

FIELD

This application relates to the technical field of flaw detection apparatuses for train wheels, and in particular to a wheel rim and spoke flaw detection system having two manipulators.

BACKGROUND

Train wheels are important running components of a train, and in order to ensure normal traveling of the train, it is required to perform ultrasonic flaw detection and maintenance to the train wheels regularly without disassembling the wheels. The flaw detection uses an automated positioning mechanism to carry a flaw detection carrier and allows the flaw detection carrier to be positioned for abutting against a surface of a wheel, and then the wheel is rotated by a lifting and rotating mechanism, and a positioned probe scans all around the wheel. A flaw detection system uses the scan results of the probe to analyze whether the wheel is damaged or not, thus achieves the flaw detection to the wheel. It may be known that, whether the flaw detection system can accurately and efficiently position the flaw detection carrier to a designated surface of the wheel, in a space under the train, in an unhindered manner without disassembling the wheel may relate to the flaw detection reliability and the flaw detection efficiency of the entire train.

Currently, there are three types of flaw detection systems, including a wheel rim and spoke flaw detection system having a single carrier, a wheel rim and spoke flaw detection system based on two probe carriers in the form of a guide rail, and a wheel rim and spoke flaw detection system based on two probe carriers in the form of manipulators.

(1) The wheel rim and spoke flaw detection system having a single carrier is equipped with a single tread carrier. When one wheelset (two wheels) of a train is detected, it is required to rotate each of the wheels two revolutions and successively detect the two wheels in order. Moreover, when a positioning space of the tread carrier is limited, it is required to rotate an entire operation platform by 180 degrees and perform the flaw detection at another side of the wheelset, which causes a limited operating efficiency.

(2) The two probe carriers of the wheel rim and spoke flaw detection system based on two guide rail type probe carriers are arranged at a side of a lifting and rotating device. In detecting, the flaw detection of one wheelset (two wheels) may be completed by rotating each of the wheels one revolution. However, the flaw detection may only be carried out from one side of the wheel. In the event that the positioning is interfered and hindered in a path at one side, it is further required to reverse the probe carriers to another side of the wheel, which causes a low operating efficiency. In addition, a guide rail-type actuator causes a high fault rate due to having no closed protective hood.

(3) Two probe carriers of the wheel rim and spoke flaw detection system based on two probe carriers in the form of manipulators are arranged at two sides of a lifting and rotating mechanism. The system may also detect one wheelset (two wheels) of a train at one time. However, the manipulators of the system are mounted to a chassis of an inspection trolley, which have a fixed height and cannot be automatically adjusted in the case that the height of a rail on site changes, and thus the manipulators cannot be ensured to be maintained in a determined positional relationship with the wheel rail, which causes the system unable to adapt to complex and ever-changing field application environments. In addition, a lifting and rotating mechanism of the system is directly mounted to the chassis of the trolley, and a small assisting movement track is located below the chassis of the trolley. When the wheel is lifted up, part of the pressure between the wheelset and the lifting and rotating mechanism may act directly on the chassis of the trolley, and further act on the small movement assisting track, thus the ground may be caused to sink, which is inconvenient to position, reduces the positioning accuracy, and may further cause potential safety hazards.

Therefore, a technical issue to be addressed currently by the person skilled in the art is to provide a wheel rim and spoke flaw detection system which facilitates the flaw detection and has high safety.

SUMMARY

An object of the present application to provide a wheel rim and spoke flaw detection system having two manipulators which not only facilitates positioning and detection but also has high safety.

In order to address the above issue, a following technical solution is provided according to the present application.

A wheel rim and spoke flaw detection system having two manipulators is provided according to the present application, which includes a moving trolley, a lifting and lowering platform, a lifting and rotating mechanism and manipulators. The lifting and lowering platform is connected to the moving trolley and movable in a vertical direction. The lifting and rotating mechanism is arranged on the lifting and lowering platform. Each of a left side and a right side of the lifting and rotating mechanism is provided with a wheel lifting arm, and the wheel lifting arms are configured to rest on a rail where a wheel to be detected is located. Each of a front side and a back side of the lifting and rotating mechanism is connected to one of the manipulators. Each of the manipulators is provided with a tread carrier. The lifting and rotating mechanism is further provided with two inside carriers.

Preferably, in the wheel rim and spoke flaw detection system having two manipulators, the lifting and rotating mechanism includes a lifting and rotating base and manipulator mounting bases. Each of a front side and a back side of the lifting and rotating base is fixedly connected to one of the manipulator mounting bases. Each of the manipulator mounting bases is provided with one of the manipulators.

Preferably, in the wheel rim and spoke flaw detection system having two manipulators, each of a left side and a right side of the lifting and rotating base is fixedly provided with two wheel lifting force receiving shafts. A periphery of each of the wheel lifting force receiving shafts is rotatably sleeve-coupled with one wheel lifting swing arm. An upper end of each of the wheel lifting swing arms is provided with a lifting roller for contacting the wheel. Lower ends of the two wheel lifting swing arms, located at the same side, for the wheel are connected through a wheel lifting telescopic rod.

Preferably, in the wheel rim and spoke flaw detection system having two manipulators, the wheel lifting telescopic rod is a wheel lifting oil cylinder.

Preferably, in the wheel rim and spoke flaw detection system having two manipulators, each of a left side and a right side of the lifting and rotating mechanism is provided with two wheel lifting arms. The wheel lifting arms are slidably secured to the lifting and rotating base through a telescopic mechanism in a direction perpendicular to the rail where the wheel is located.

Preferably, in the wheel rim and spoke flaw detection system having two manipulators, the telescopic mechanism is a telescopic oil cylinder.

Preferably, in the wheel rim and spoke flaw detection system having two manipulators, the lifting and lowering platform is connected onto the moving trolley through a lifting and lowering oil cylinder.

Preferably, in the wheel rim and spoke flaw detection system having two manipulators, the moving trolley is provided with a guide rail arranged in the vertical direction, and the lifting and lowering platform is provided with a slider slidingly cooperating with the guide rail.

The wheel rim and spoke flaw detection system having two manipulators according to the present application includes the moving trolley, the lifting and lowering platform, the lifting and rotating mechanism and the manipulators. The lifting and lowering platform is connected to the moving trolley and movable in the vertical direction. The lifting and rotating mechanism is arranged on the lifting and lowering platform. Each of the left side and the right side of the lifting and rotating mechanism is provided with the wheel lifting arm, and the wheel lifting arms are configured to rest on the rail where the wheel to be detected is located. Each of the front side and the back side of the lifting and rotating mechanism is connected to one of the manipulators. Each of the manipulators is provided with the tread carrier. The lifting and rotating mechanism is further provided with the two inside carriers. The flaw detection system is provided with the two tread carriers and the two inside carriers, thus the flaw detection system may detect two wheels of a wheelset at the same time. Since the manipulators are fixed at the front side and the back side of the lifting and rotating mechanism respectively and may ascend along with the lifting and rotating mechanism in this solution, the position of each of the manipulators may be remained constant with respect to the position of the lifting and rotating mechanism, which facilitates improving the positioning accuracy and addresses the issue of inconvenient positioning of the manipulators caused by sinking of a track. In addition, the wheel lifting arms rest on the rail, and the force applied by the wheel on the lifting and rotating mechanism is completely transmitted to the rail via the wheel lifting arms, thus the moving trolley is prevented from receiving force, which prevents the infrastructure from sinking.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only examples of the present application, and for the person skilled in the art, other drawings may be obtained based on the drawings without any creative efforts.

Figure 1:
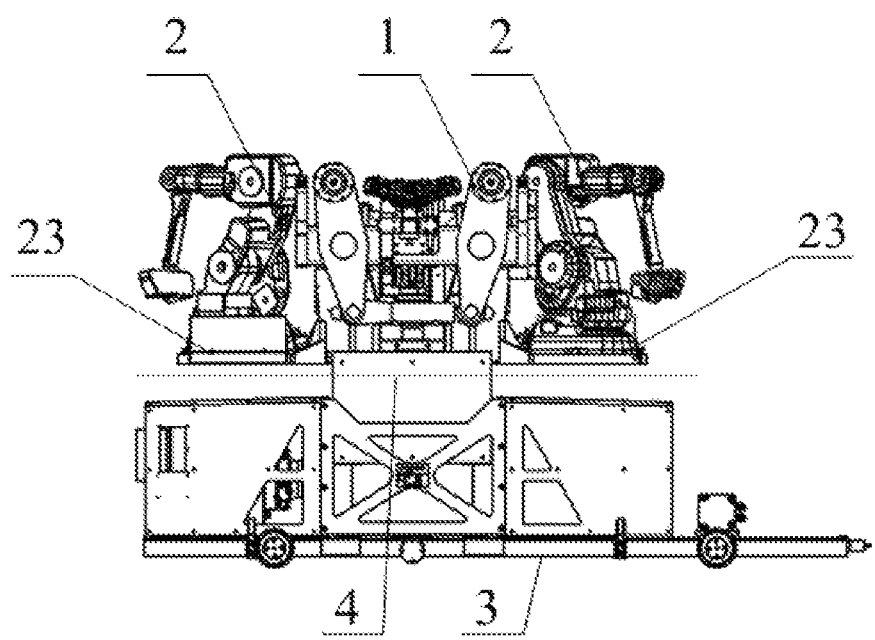
FIG. 1 is a schematic view showing the overall structure of a flaw detection system according to an embodiment of the present application.
Figure 2:
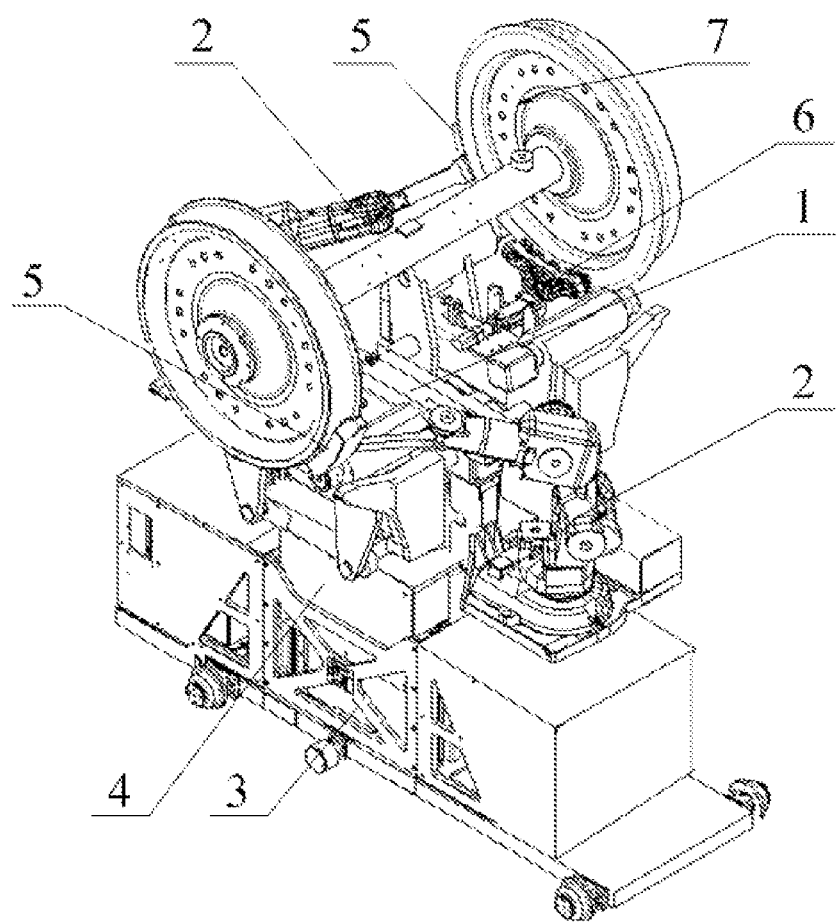
FIG. 2 is a schematic view showing the structure of the flaw detection system according to the embodiment of the present application in use.

| Reference Numerals in FIGS. 1 to 12: | |
|---|---|
| 1. lifting and rotating mechanism, | 2. manipulator, |
| 3. moving trolley, | 4. lifting and lowering platform, |
| 5. tread carrier, | 6. inside carrier, |
| 7. wheelset | 8. rail, |
| 9. obstacle, | 10. lifting and rotating base, |
| 11. wheel lifting cross beam, | 12. wheel lifting oil cylinder, |
| 13. wheel lifting swing arm, | 14. wheel lifting force receiving shaft, |
| 15. wheel lifting arm, | 16. lifting roller, |
| 17. telescopic oil cylinder, | 18. roller driver, |
| 19. flange sleeve, | 21. first manipulator, |
| 22. second manipulator, | 23. manipulator mounting base, |
| 31. guide rail, | 41. slider, |
| 42. lifting and lowering oil cylinder, | 51. first probe, |
| 52. second probe, | 71. first wheel, |
| 72. second wheel. | |

DETAILED DESCRIPTION OF THE EMBODIMENTS

The technical solutions in the embodiments of the present application are described clearly and completely hereinafter in conjunction with the drawings in the embodiments of the present application. Apparently, the described examples are merely a part and not all embodiments of the present application. All other embodiments obtained by the person skilled in the art based on the embodiments of the present application without creative efforts shall fall within the protection scope of the present application.

Referring to FIG. 1 to FIG. 12, in a solution according to an embodiment, a wheel rim and spoke flaw detection system having two manipulators is provided according to the present application, which is used for performing flaw detection to a wheel of a rail vehicle such as a train or an Electric Multiple Units (EMUs). The flaw detection system includes a moving trolley 3, a lifting and lowering platform 4, a lifting and rotating mechanism 1 and manipulators 2. The lifting and lowering platform 4 is connected to the moving trolley 3 and movable in a vertical direction. The lifting and rotating mechanism 1 is provided on the lifting and lowering platform 4. Each of a left side and a right side of the lifting and rotating mechanism 1 is provided with a wheel lifting arm 15. Two wheel lifting arms 15 are configured to rest on and connect a rail 8 where a wheel to be detected is located. Each of a front side and a back side of the lifting and rotating mechanism 1 is fixedly connected to a corresponding manipulator 2. Each of the manipulators 2 is provided with a tread carrier 5. The lifting and rotating mechanism 1 is further provided with two inside carriers 6.

Specifically, in the wheel rim and spoke flaw detection system having two manipulators, the moving trolley 3 is used for holding and carrying the upper lifting and lowering platform 4 and the lifting and rotating mechanism 1 and other components on the moving trolley 3. The moving trolley 3 is moved in a detection trench, for performing flaw detection to wheelsets 7 at different positions. The lifting and lowering platform 4 is used for lifting the lifting and rotating mechanism 1 to a detection position, which facilitates the lifting and rotating mechanism positioning a detection portion of the wheel. When the detection is completed, the lifting and rotating mechanism 1 is lowered onto the moving trolley 3 along with the lifting and lowering platform 4. The lifting and rotating mechanism 1 is positioned and supported on the rail, and then jacks a wheelset 7 away from the rail 8, and may thus drive the wheel to rotate through a lifting roller 16 of the lifting and rotating mechanism 1. The manipulator 2 drives the tread carrier 5 to be positioned to a tread of the wheel, thus the rotating wheel is detected by a probe on the tread carrier 5. A surface of the wheel is detected by an inside probe of the inside carrier 6 from an inner side of the wheel.

When the flaw detection system is moved in a detection trench, the height of a track in the trench may fluctuate within a range of not greater than 30 mm at different positions, which causes the manipulators also to fluctuate up and down due to following the moving trolley and is thus inconvenient to position. In this solution, the manipulators 2 are designed to be integrated with and fixed to the lifting and rotating mechanism 1, which can address the above issues. Moreover, by adjusting the height position of the lifting and lowering platform 4, the flaw detection system may further adapt to the height error of the track in the trench, which may be greater than 30 mm. Specifically, after the lifting and rotating mechanism 1 is positioned, the position of the lifting and rotating mechanism 1 is always fixed with respect to the position of the rail 8, and the manipulators 2 are fixedly connected to the lifting and rotating mechanism 1, which may ensure the distance between a base of each of the manipulators 2 and the wheel to be relatively constant, thereby improving the positioning accuracy.

The flaw detection system is provided with two tread carriers 5 and two inside carriers 6, which may thus detect two wheels of the wheelset 7 at the same time. Since the manipulators 2 in this solution are fixed to the front side and the back side of the lifting and rotating mechanism 1 and may ascend along with the lifting and rotating mechanism 1, the position of each of the manipulators 2 may be remained unchanged with respect to the position of the lifting and rotating mechanism 1, which facilitates improving the positioning accuracy and addresses the issue of inconvenient positioning of the manipulators caused by sinking of the track in the trench. In addition, the wheel lifting arms 15 rest on the rail, and the force applied by the wheel on the lifting and rotating mechanism is completely transmitted to the rail via the wheel lifting arms, thus the moving trolley is prevented from receiving force, which prevents the infrastructure from sinking.

It should be noted that, in this solution, the manipulators 2 may be directly fixed to a base of the lifting and rotating mechanism 1, or mounting bases specially for mounting of the manipulators 2 may be respectively provided at the two sides of the lifting and rotating mechanism 1. Preferably, in this solution, the lifting and rotating mechanism 1 includes a lifting and rotating base 10 and manipulator mounting bases 23. Each of a front side and a back side of the lifting and rotating base 10 is fixedly connected to one manipulator mounting base 23. The manipulator mounting base 23 is provided with one manipulator 2. The manipulator mounting bases 23 may be directly welded to the lifting and rotating base 10 or may alternatively be securely connected to the lifting and rotating base 10 by bolts. Of course, the manipulator mounting bases 23 may also be designed as an integral structure with the lifting and rotating base 10.

Figure 6:
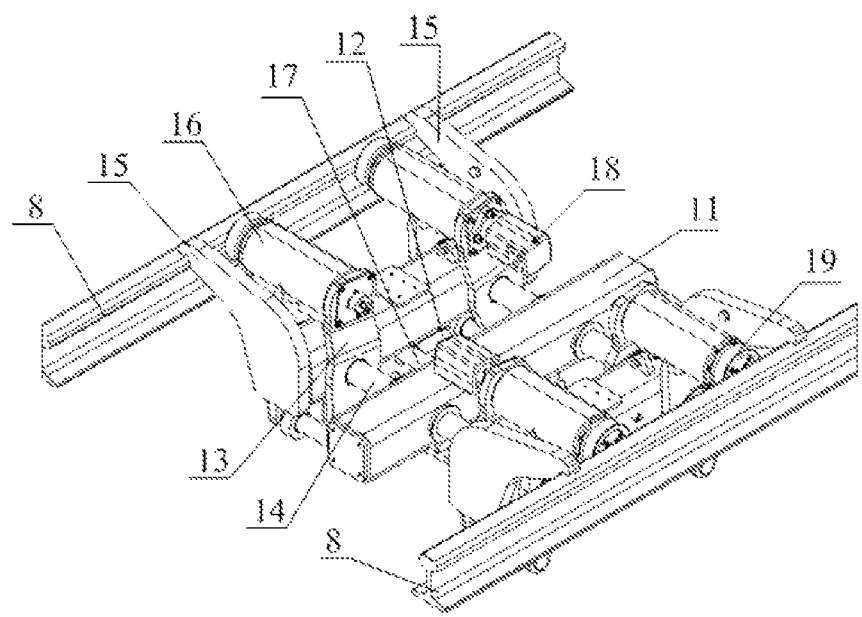
FIG. 6 is a schematic view showing the structure of the lifting and rotating mechanism according to the embodiment of the present application.

Referring to FIG. 6, it should be noted that the lifting and rotating mechanism 1 is further improved according to the present application. The lifting and rotating mechanism 1 in the present application includes the wheel lifting arms 15, a wheel lifting force receiving shaft 14, a wheel lifting swing arm 13, a wheel lifting telescopic rod and the lifting roller 16 and other components. Specifically, each of a left side and a right side of the lifting and rotating base 10 is fixedly provided with two wheel lifting force receiving shafts 14. A periphery of each of the wheel lifting force receiving shafts 14 is rotatably sleeved with the wheel lifting swing arm 13. An upper end of each of the wheel lifting swing arms 13 is provided with the lifting roller 16 for contacting the wheel. Lower ends of the two wheel lifting swing arms 13, located at the same side, for the wheel are connected through the wheel lifting telescopic rod.

In order to facilitate the arrangement of the wheel lifting force receiving shafts 14, in this solution, the lifting and rotating base 10 is provided with a wheel lifting cross beam 11, the wheel lifting cross beam 11 is integrally fixed to the lifting and rotating base 10, and an extension direction of the wheel lifting cross beam 11 is the same with a movement direction of the moving trolley 3 in operation, that is, the same with an extension direction of the rail 8, as shown in FIG. 6. The wheel lifting force receiving shaft 14 serves as a rotating shaft for the wheel lifting swing arm 13, so as to allow the wheel lifting swing arm 13 to rotate with respect to the lifting and rotating base 10. The wheel lifting swing arm 13 is rotatably connected to the wheel lifting force receiving shaft 14 in a vertical plane. A rotation plane of each of the wheel lifting swing arms 13 is arranged parallel to the plane where a spoke of the wheel to be detected is located. In this way, the lifting roller 16 located at the upper end of the wheel lifting swing arms 13 may be rotationally positioned below the wheel to be detected in a convenient manner, thus the wheel may be lifted up more easily.

Figure 7:
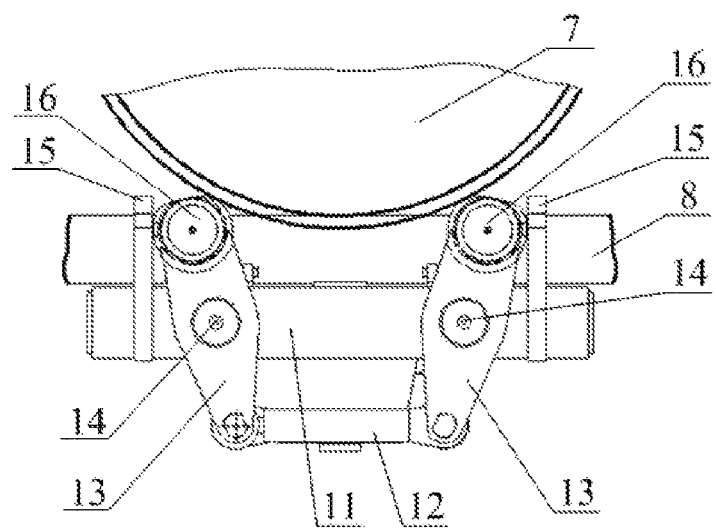
FIG. 7 is a schematic view of the lifting and rotating mechanism in a state of dropping a wheel according to the embodiment of the present application.
Figure 8:
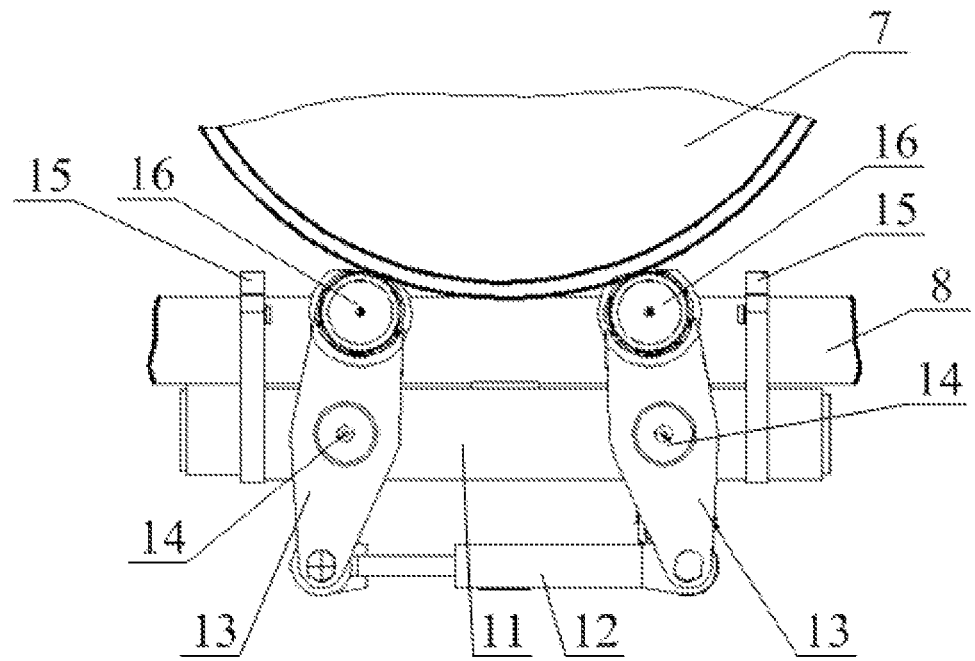
FIG. 8 is a schematic view of the lifting and rotating mechanism in a state of lifting a wheel according to the embodiment of the present application.

Referring to FIGS. 7 and 8, the wheel lifting arms 15 and the wheel lifting force receiving shafts 14 are both fixedly connected to the lifting and rotating base 10. The wheel lifting force receiving shafts 14 transmit the pressure applied by the wheelset 7 on the wheel lifting swing arms 13 to the lifting and rotating base 10 and further to the rail 8 via the wheel lifting arms 15.

The wheel lifting swing arm 13 in this solution is a plate-shaped member. The wheel lifting swing arm 13 is sleeved on a periphery of the wheel lifting force receiving shaft 14 through a middle portion of the wheel lifting swing arm 13, that is, there is a distance between either end of the wheel lifting swing arm 13 and an axial center of the wheel lifting force receiving shaft 14. In this way, the wheel lifting swing arm 13 may be provided as a lever having a fulcrum located at the axial center of the wheel lifting force receiving shaft 14. If an end of the wheel lifting swing arm 13 is moved, another end of the wheel lifting swing arm 13 may rotate around the fulcrum accordingly. Therefore, in this solution, the wheel lifting telescopic rod for driving the wheel lifting swing arms 13 to rotate is provided at the lower end of each of the wheel lifting swing arms 13, and two ends of the wheel lifting telescopic rod are connected to the lower ends of the two wheel lifting swing arms 13 respectively. In this way, when the wheel lifting telescopic rod is extended, the upper ends of the two wheel lifting swing arms 13 come close to each other, and the two lifting rollers 16 in contact with the wheel may continue to move to jack the wheel up, as shown in FIG. 8; when the wheel lifting telescopic rod is retracted, the upper ends of the two wheel lifting swing arms 13 go away from each other, and thus the supported wheel is lowered, as shown in FIG. 7.

It should be noted that, the lifting and rotating mechanism 1 further includes a roller driver 18 for driving the lifting roller 16 to rotate. When the roller driver 18 drives the lifting roller 16 to rotate, the wheelset 7 in contact with the lifting roller 16 may rotate together with the lifting roller 16, thus the flaw detection system can perform the flaw detection to the entire tread and the entire spoke of the wheel. Since the wheelset 7 has a heavy weight, a flange sleeve 19 is preferably sleeved on a periphery of the lifting roller 16 in this solution, so as to prevent a contact surface of the wheelset 7 in contact with the lifting roller 16 from being damaged.

It should be noted that, the wheel lifting telescopic rod may be in multiple structural forms, for example in the form of a telescopic hydraulic cylinder, a rack and pinion telescopic rod or a crank and connecting rod mechanism, and so on. Preferably, the wheel lifting telescopic rod in this solution is a wheel lifting oil cylinder 12. Two ends of the wheel lifting oil cylinder 12 are connected to the lower ends of the two wheel lifting swing arms 13, respectively. The wheel lifting oil cylinder 12 may provide a large lifting force and operate stably.

It should be noted that, before the lifting roller 16 is positioned and supported below the wheel, it is required to first lift the entire lifting and rotating mechanism 1 to a positioning height and then to distribute the lifting rollers 16 at a front side and a back side of the tread of the wheel and below the tread, and at the same time, it is further required to rest the wheel lifting arms 15 against the rail 8 to form support. Therefore, the lifting and rotating mechanism 1 further includes a positioning mechanism for placing the lifting rollers 16 and the wheel lifting arms 15 and other components below the wheel. Specifically, the positioning mechanism may be a rotating and positioning mechanism which rotates the above components in place, or may be a telescopic mechanism which performs rectilinear sliding movement. Preferably, the telescopic mechanism is employed in this solution.

Figure 3:
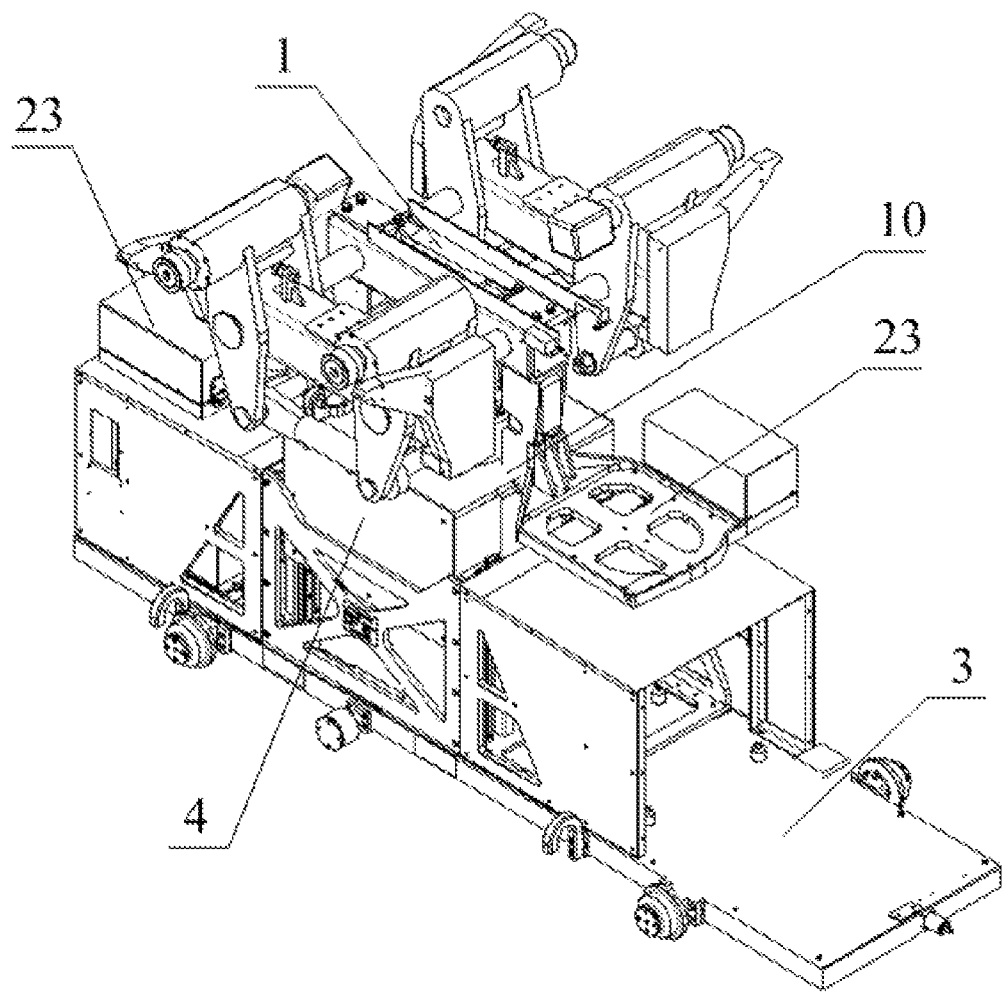
FIG. 3 is a schematic view showing the structure of the flaw detection system according to the embodiment of the present application with manipulators removed.
Figure 4:
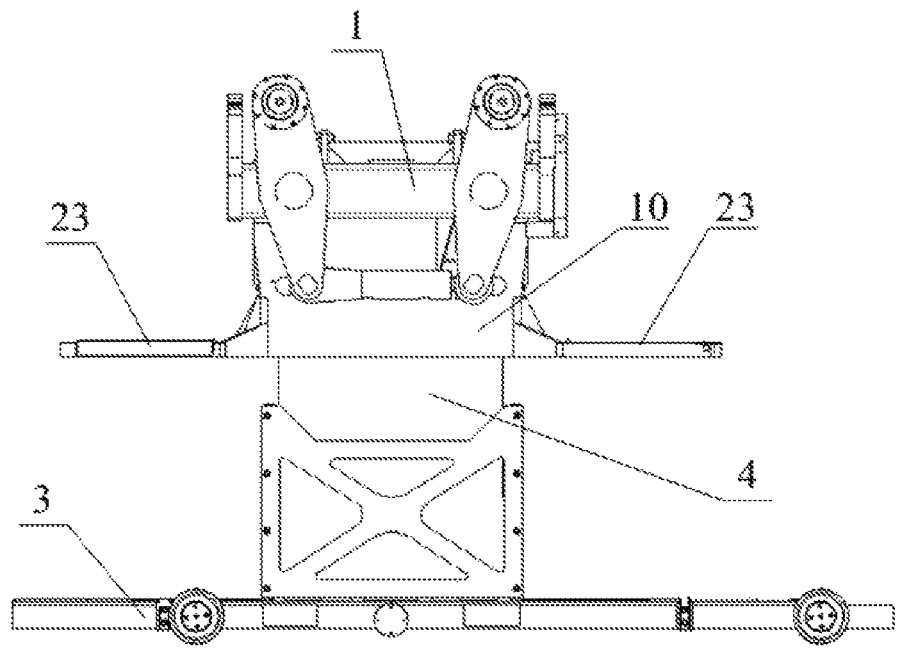
FIG. 4 is a schematic view showing a connection relationship between a lifting and rotating mechanism and a lifting and lowering platform according to the embodiment of the present application.

Specifically, the telescopic mechanism has one end connected to the lifting and rotating base 10 and another end connected to the wheel lifting arms 15 and the wheel lifting swing arms 13 and other components. In order to ensure the wheel lifting force receiving shafts 14 to be stably connected to the lifting and rotating base 10, a cross beam is further provided at an end of each of the wheel lifting force receiving shafts 14 in this solution. The cross beam is slidably connected to the lifting and rotating base 10 via the telescopic mechanism. The cross beam is also fixed to the wheel lifting arms 15. Before the detection, the cross beam is pushed by the telescopic mechanism to an inner side of the wheel, and the wheel lifting arms 15 are extended above the rail 8. In order to transfer the weight of the wheel to the lifting and rotating base 10 better, a lower portion of each of the lifting rollers 16 is connected to two wheel lifting swing arms 13 in this solution. As shown in FIG. 3, the two wheel lifting swing arms 13 under each of the lifting rollers 16 are distributed at two sides of the cross beam to realize smooth connection.

It should be noted that, the two inside carriers 6 may also slide in a left-right direction of the flaw detection system through the above telescopic mechanism, so as to achieve the positioning and detecting of a spoke at an inner side of the wheel. Similar to the wheel lifting telescopic rod, the telescopic mechanism may also be in multiple structural forms, for example in the form of a telescopic hydraulic cylinder or a rack and pinion telescopic rod, and so on. Preferably, the telescopic mechanism is a telescopic oil cylinder 17, as shown in FIG. 6.

It should be noted that, in order to fix the lifting and rotating mechanism 1 more stably to the rail 8, in this solution, preferably, multiple wheel lifting arms 15 are provided. The multiple wheel lifting arms 15 may allow the weight of the wheelset 7 and the weight of the lifting and rotating mechanism 1 to be more evenly transmitted to the rail 8. Specifically, in this solution, each of the left side and the right side of the lifting and rotating mechanism 1 is provided with two wheel lifting arms 15, which are slidably secured to the lifting and rotating base 10 through the above telescopic mechanism in a direction perpendicular to the rail 8 where the wheel is located.

It should be noted that, the lifting and lowering platform 4 is connected onto the moving trolley 3 through a lifting and lowering mechanism. The lifting and lowering mechanism may be a lifting and lowering hydraulic cylinder or a chain transmission lifting and lowering mechanism. Preferably, a lifting and lowering oil cylinder 42 is selected as the lifting and lowering mechanism in this solution, as shown in FIG. 5.

Figure 5:
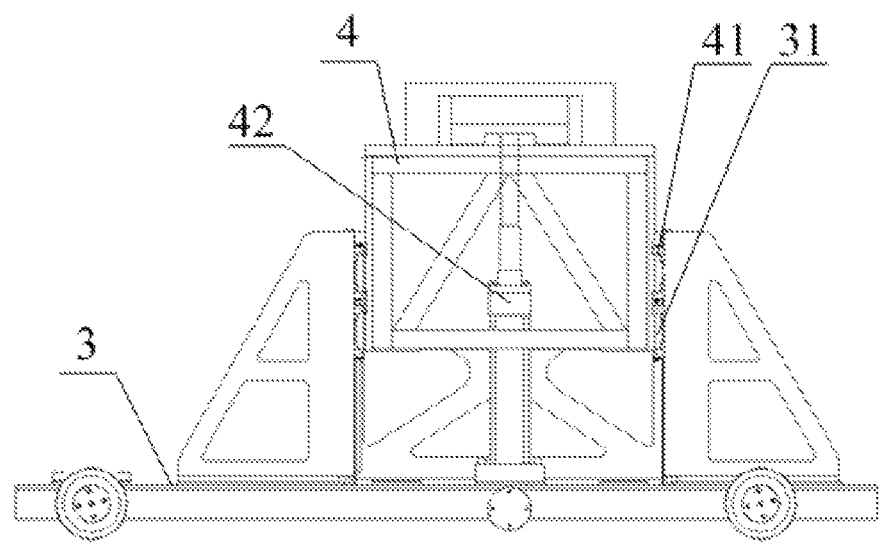
FIG. 5 is a schematic view showing the lifting and lowering platform connected to a moving trolley according to the embodiment of the present application.

In order to further improve the smoothness of the lifting and lowering platform 4 in a lifting and lowering process, preferably, in this solution, the moving trolley 3 is provided with a guide rail 31 arranged in the vertical direction, and the lifting and lowering platform 4 is correspondingly provided with a slider 41 slidingly cooperating with the guide rail 31, as shown in FIG. 5.

Referring to FIG. 9 to FIG. 12, an operation process of the flaw detection system is described hereinafter, which includes the following seven steps.

In a first step, the moving trolley 3 is moved back and forth in an extension direction of the rail 8, and the center of the lifting and rotating mechanism 1 is positioned below the center of the wheelset 7;

In a second step, the lifting and lowering platform 4 jacks the lifting and rotating mechanism 1 up through the lifting and lowering oil cylinder 42 and causes the wheel lifting arms 15 to be above a rail surface of the rail 8, and the manipulator mounting bases 23 and the manipulators 2 also ascend along with the lifting and rotating mechanism 1;

In a third step, the lifting and rotating mechanism 1 causes the left two wheel lifting arms 15 and the right two wheel lifting arms 15 to abut against an inner side of the rail 8 through the telescopic oil cylinder 17 respectively;

In a fourth step, the lifting and lowering oil cylinder 42 is unloaded and the lifting and lowering platform 4 descends. Then, under the gravity of each of the lifting and rotating mechanism 1 and the manipulators 2 on the lifting and lowering platform 4, the entire lifting and rotating mechanism 1 descends until the four wheel lifting arms 15 all come into contact with the rail 8. Then, the lifting and rotating mechanism 1 no longer descends, and the lifting and lowering platform 4 is no longer subjected to the pressure from each of the lifting and rotating mechanism 1 and the manipulators 2 on the lifting and lowering platform 4;

In a fifth step, the wheel lifting oil cylinder 12 is extended, the upper ends of the two wheel lifting swing arms 13 are squeezed facing each other and further come into contact with the tread of the wheel to jack the wheel away from the rail 8. A supporting force for the lifting rollers 16 come from the wheel lifting oil cylinder 12. The pressure to which the lifting rollers 16 are subjected is finally transmitted to the rail 8 completely through the four wheel lifting arms 15;

In a sixth step, after the wheel is lifted up, the inside carriers 6 are positioned at the inner side of the wheel; and In a seventh step, after the above steps are completed, the manipulators 2 at two sides respectively carry the tread carriers 5 to position the tread carriers 5 below the treads of the wheels at two sides of the wheelset 7. After positioning of the tread carriers 5 is completed, the flaw detection to the wheels may be carried out through the probes of the inside carriers 6 and the probes of the tread carriers 5.

Figure 9:
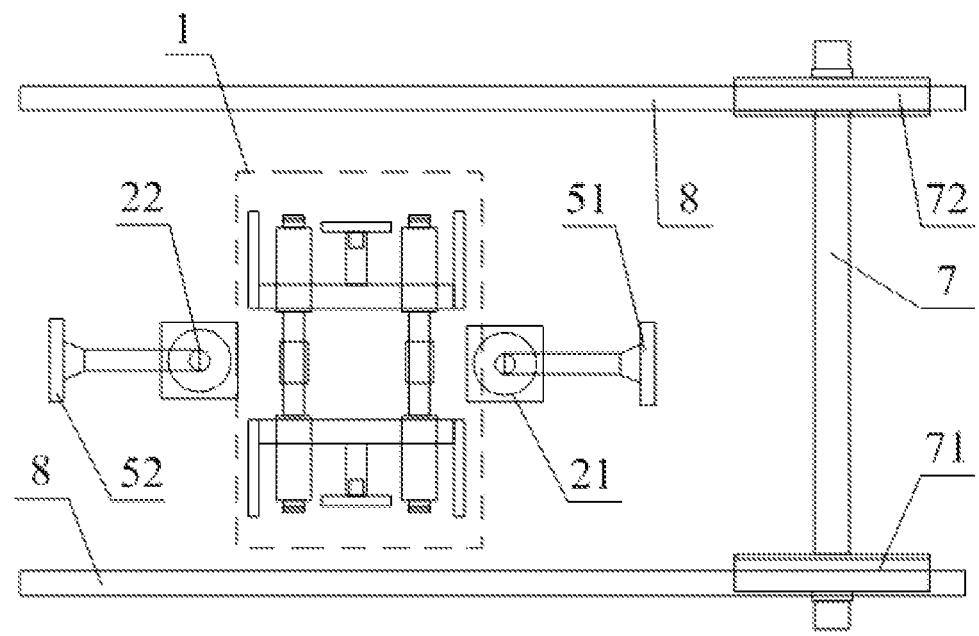
FIG. 9 is a schematic view showing the layout of the flaw detection system according to the embodiment of the present application.

The tread carriers 5 and the inside carriers 6 are respectively used for mounting of the probes for the flaw detection. Referring to FIG. 9, a first manipulator 21 and a first probe 51 of the first manipulator 21 are provided at a right side of the lifting and rotating mechanism 1, a second manipulator 22 and a second probe 52 are provided at a left side of the lifting and rotating mechanism 1, and two ends of the wheelset 7 are a first wheel 71 and a second wheel 72, respectively.

Figure 10:
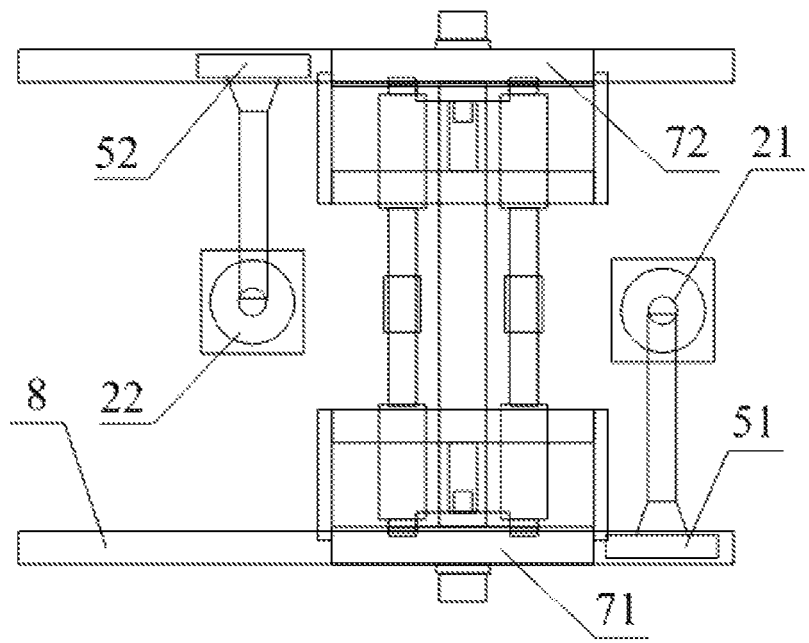
FIG. 10 is a schematic view of the flaw detection system according to the embodiment of the present application in a first operation mode.

Referring to FIG. 10, in a first operation mode, there is no obstacle at a front side and a back side of the wheelset 7. Therefore, the manipulators 2 at the two sides of the lifting and rotating mechanism 1 may detect two wheels at the same time. For example, the first probe 51 is positioned to the first wheel 71 and the second probe 52 is positioned to the second wheel 72. Of course, the first manipulator 21 and the second manipulator 22 may alternatively rotate by 180 degrees to detect the two wheels alternatingly.

It may be known that two wheels of the same wheelset 7 may be simultaneously detected in a positioning and detecting manner of this solution, which improves the detection efficiency.

Figure 11:
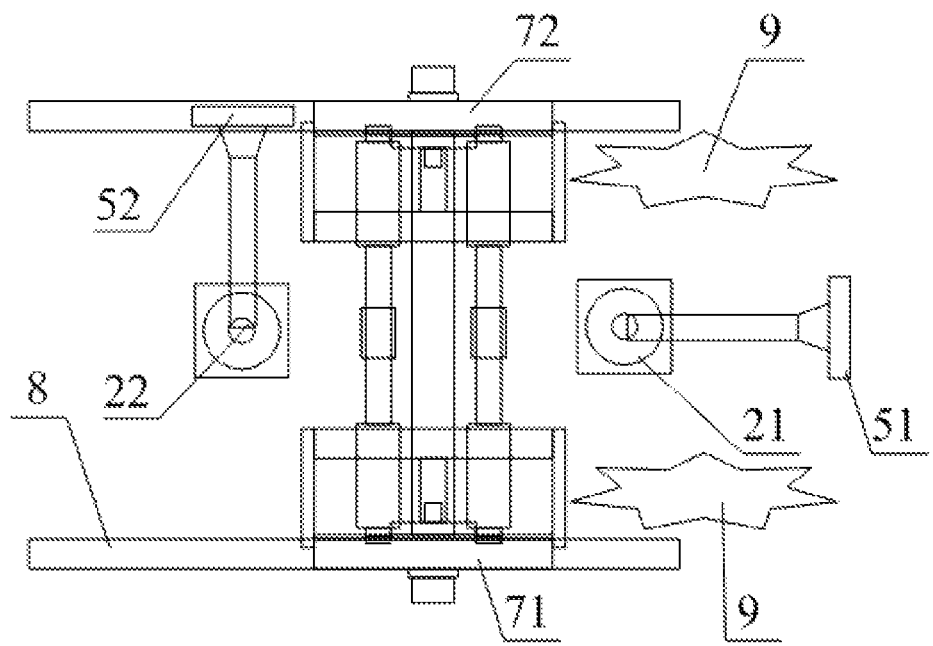
FIG. 11 is a schematic view of the flaw detection system according to the embodiment of the present application in a second operation mode.
Figure 12:
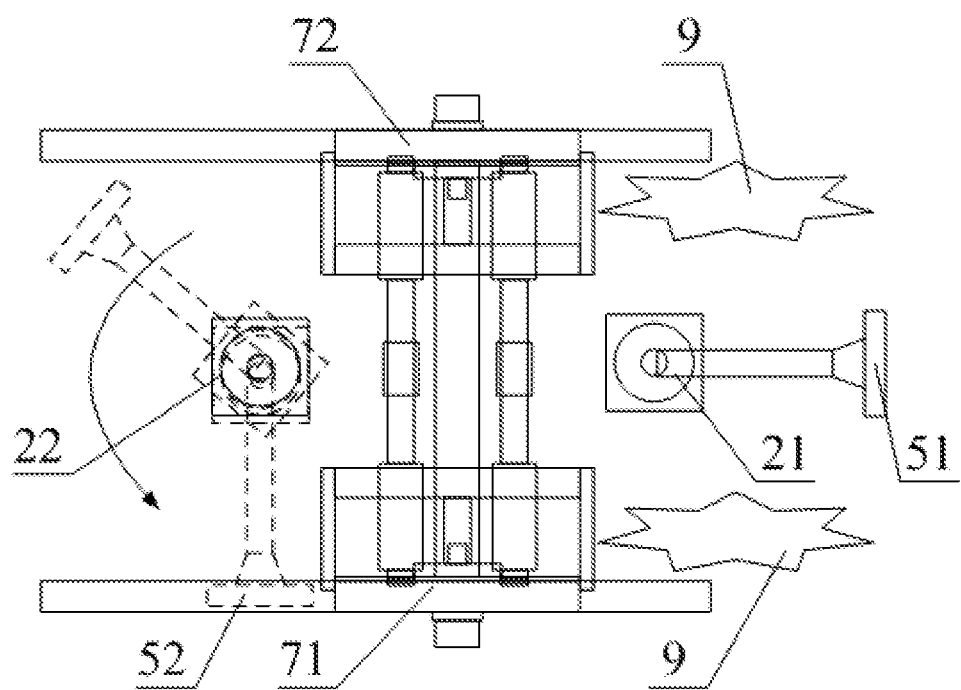
FIG. 12 is a schematic view showing rotation of the manipulators of the flaw detection system manipulator according to the embodiment of the present application.

Referring to FIG. 11 and FIG. 12, in a second operation mode, an obstacle 9, which hinders the positioning, exists at a side of the wheelset 7, thus, for example, the first manipulator 21 in FIG. 11 cannot be positioned to perform the detection. Therefore, the second manipulator 22 located at another side of the wheelset 7 is positioned to detect the two wheels one after the other. As shown in FIG. 12, the second manipulator 22 may rotate freely, which allows the second probe 52 to be positioned to successively detect the second wheel 72 and the first wheel 71.

It may be known that, in the second operation mode, in this solution, the obstacle 9 hindering positioning may be avoided and the manipulators 2 at two sides may be freely combined to be positioned for the detection, which improves the versatility.

For wheelset detection of the entire train or the entire EMUs, it can start from two ends of the train or the EMUs, and the flaw detection of the wheelset may be performed successively in a combined detection manner of the above two operation modes.

The present application has the following advantages.

1. The flaw detection system according to the present application is equipped with the two manipulators 2 arranged at the two sides of the lifting and rotating mechanism 1 respectively, which allows a freely combined positioning manner.

2. The flaw detection system according to the present application has a high operating efficiency, and may perform the flaw detection of two wheels of one wheelset 7 at the same time.

3. The flaw detection system according to the present application has a strong adaptability, the situation that the obstacle 9 exists at a single side of the wheelset 7 may be avoided, and fast and effective positioning may be carried out.

4. The positioning accuracy is high, and the manipulator mounting bases 23 are an integral structure with the lifting and rotating mechanism 1, which facilitates precise positioning of the probes.

5. The flaw detection system according to the present application has a high safety, and the moving trolley 3 is prevented from receiving force, which reduces potential safety hazards.

6. The flaw detection system according to the present application may perform the flaw detection of a current domestic train or a current domestic motor train set orderly, and the efficiency of the flaw detection system is higher than the efficiency of a current detection apparatus of the same type.

The above explanation of the disclosed embodiments enables the person skilled in the art to implement or use the present application. It is apparent for the person skilled in the art to make multiple modifications to these embodiments. The general principles defined herein may be implemented in other embodiments without departing from the spirit or scope of the present application. Therefore, the present application is not limited to these embodiments illustrated herein, and should conform to a broadest scope in consistent with the principles and novel features disclosed herein.

The invention claimed is:

1. A wheel rim and spoke flaw detection system having two manipulators, comprising:
   a moving trolley;
   a lifting and lowering platform;
   a lifting and rotating mechanism; and
   two manipulators,
   wherein the lifting and lowering platform is connected to the moving trolley and movable in a vertical direction, and the lifting and rotating mechanism is arranged on the lifting and lowering platform, each of a left side and a right side of the lifting and rotating mechanism is provided with a wheel lifting arm, the wheel lifting arm is configured to rest on a rail where a wheel to be detected is located, each of a front side and a back side of the lifting and rotating mechanism is connected to one of the two manipulators, each of the two manipulators is provided with a tread carrier, and the lifting and rotating mechanism is further provided with two inside carriers.

2. The wheel rim and spoke flaw detection system having two manipulators according to claim 1, wherein the lifting and rotating mechanism comprises a lifting and rotating base and manipulator mounting bases, each of a front side and a back side of the lifting and rotating base is fixedly connected to one of the manipulator mounting bases, and each of the manipulator mounting bases is provided with one of the two manipulators.

3. The wheel rim and spoke flaw detection system having two manipulators according to claim 2, wherein each of a left side and a right side of the lifting and rotating base is fixedly provided with two wheel lifting force receiving shafts, a periphery of each of the wheel lifting force receiving shafts is rotatably sleeve-coupled with one wheel lifting swing arm, and an upper end of the wheel lifting swing arm is provided with a lifting roller for contacting the wheel, and lower ends of the two wheel lifting swing arms, located at a same side, for the wheel are connected through a wheel lifting telescopic rod.

4. The wheel rim and spoke flaw detection system having two manipulators according to claim 3, wherein the wheel lifting telescopic rod is a wheel lifting oil cylinder.

5. The wheel rim and spoke flaw detection system having two manipulators according to claim 2, wherein each of a left side and a right side of the lifting and rotating mechanism is provided with two wheel lifting arms, and the wheel lifting arms are slidably secured to the lifting and rotating base through a telescopic mechanism in a direction perpendicular to the rail where the wheel is located.

6. The wheel rim and spoke flaw detection system having two manipulators according to claim 5, wherein the telescopic mechanism is a telescopic oil cylinder.

7. The wheel rim and spoke flaw detection system having two manipulators according to claim 1, wherein the lifting and lowering platform is connected onto the moving trolley through a lifting and lowering oil cylinder.

8. The wheel rim and spoke flaw detection system having two manipulators according to claim 7, wherein the moving trolley is provided with a guide rail arranged in the vertical direction, and the lifting and lowering platform is provided with a slider slidingly cooperating with the guide rail.

* * * * *